US007233690B2

(12) United States Patent
Lacy

(10) Patent No.: US 7,233,690 B2
(45) Date of Patent: Jun. 19, 2007

(54) METHOD AND SYSTEM FOR FRAUD DETECTION

(76) Inventor: Donald D. Lacy, 11300 Wilson Rd., Utica, OH (US) 43080

(*) Notice: Subject to any disclaimer, the term of this patent is extended or adjusted under 35 U.S.C. 154(b) by 714 days.

(21) Appl. No.: 10/345,091

(22) Filed: Jan. 14, 2003

(65) Prior Publication Data

US 2004/0136572 A1 Jul. 15, 2004

(51) Int. Cl.
*G06K 9/00* (2006.01)
*G06Q 40/00* (2006.01)
(52) U.S. Cl. .................. 382/137; 382/116; 705/44; 705/45
(58) Field of Classification Search ............... 382/116, 382/140; 705/44–45
See application file for complete search history.

(56) References Cited

U.S. PATENT DOCUMENTS

| | | | | |
|---|---|---|---|---|
| 4,544,184 A | * | 10/1985 | Freund et al. ............... 283/94 |
| 4,947,027 A | * | 8/1990 | Golightly ..................... 235/448 |
| 5,097,517 A | * | 3/1992 | Holt .............................. 382/137 |
| 5,432,329 A | * | 7/1995 | Colgate et al. .............. 235/487 |
| 5,592,377 A | * | 1/1997 | Lipkin .......................... 705/42 |
| 5,613,012 A | | 3/1997 | Hoffman et al. |
| 5,615,277 A | | 3/1997 | Hoffman |
| 5,764,789 A | | 6/1998 | Pare, Jr. et al. |
| 5,805,719 A | | 9/1998 | Pare, Jr. et al. |
| 5,838,812 A | | 11/1998 | Pare, Jr. et al. |
| 5,870,723 A | | 2/1999 | Pare, Jr. et al. |
| 6,012,039 A | | 1/2000 | Hoffman et al. |
| 6,038,553 A | * | 3/2000 | Hyde, Jr. ...................... 705/45 |
| 6,085,976 A | * | 7/2000 | Sehr ............................ 235/384 |
| 6,119,932 A | * | 9/2000 | Maloney et al. ............. 235/380 |
| 6,131,464 A | | 10/2000 | Pare, Jr. et al. |
| 6,149,056 A | | 11/2000 | Stinson et al. |
| 6,154,879 A | | 11/2000 | Pare, Jr. et al. |
| 6,192,142 B1 | | 2/2001 | Pare, Jr. et al. |
| 6,208,264 B1 | * | 3/2001 | Bradney et al. ............. 340/5.2 |
| 6,230,148 B1 | | 5/2001 | Pare, Jr. et al. |
| 6,269,348 B1 | | 7/2001 | Pare, Jr. et al. |
| 6,366,682 B1 | | 4/2002 | Hoffman et al. |
| 6,463,416 B1 | * | 10/2002 | Messina ......................... 705/1 |
| 6,575,362 B1 | * | 6/2003 | Bator et al. .................. 235/381 |
| 6,704,039 B2 | * | 3/2004 | Pena .......................... 348/14.01 |
| 6,758,394 B2 | * | 7/2004 | Maskatiya et al. .......... 235/379 |
| 6,957,770 B1 | * | 10/2005 | Robinson ..................... 235/382 |
| 6,959,874 B2 | * | 11/2005 | Bardwell ..................... 235/493 |

(Continued)

Primary Examiner—Matthew C. Bella
Assistant Examiner—Utpal Shah
(74) Attorney, Agent, or Firm—Merchant & Gould P.C.

(57) ABSTRACT

A method of detecting fraud involving a check being cashed includes reading electronic information from an ID; reading visible information from a face of the ID; determining if the electronic information from the ID matches the visible information from the ID; and if the electronic information from the ID does not match the visible information from the ID, preventing the check from being cashed. A system for detecting fraud involving a check being cashed includes a first ID read module, a second ID read module, a first match module, and a first not cash module. The first ID read module reads electronic information from an ID. The second ID read module reads visible information from a face of the ID. The first match module determines if the electronic information from the ID matches the visible information from the ID. The first not cash module prevents the check from being cashed if the electronic information from the ID does not match the visible information from the ID.

17 Claims, 7 Drawing Sheets

U.S. PATENT DOCUMENTS

| | | |
|---|---|---|
| 2001/0000535 A1 | 4/2001 | Lapsley et al. |
| 2001/0011680 A1 | 8/2001 | Soltesz et al. |
| 2001/0016820 A1* | 8/2001 | Tanaka et al. ................. 705/1 |
| 2001/0029493 A1 | 10/2001 | Pare, Jr. et al. |
| 2001/0039533 A1 | 11/2001 | Pare, Jr. et al. |
| 2002/0039432 A1* | 4/2002 | Sheena ....................... 382/115 |
| 2002/0113122 A1* | 8/2002 | Brikho ....................... 235/379 |
| 2003/0007676 A1* | 1/2003 | Cato .......................... 382/137 |
| 2003/0033252 A1* | 2/2003 | Buttridge et al. ............. 705/45 |
| 2004/0234117 A1* | 11/2004 | Tibor ......................... 382/137 |

\* cited by examiner

METHOD AND SYSTEM FOR FRAUD DETECTION

TECHNICAL FIELD

The present invention relates to fraud detection, and more particularly, relates to fraud detection for check cashing.

BACKGROUND

Check cashing fraud, along with many types of banking scams, has grown into a twenty-one billion dollar business and is increasing at the rate of thirty percent per year. Computer equipment and software has made it easy for anyone to reproduce a valid looking check and/or drivers license. Conventional check cashing systems track information from customers cashing checks that will allow the store to track down fraudulent customers after the transaction is complete, after the customer is gone, and after the customer has already been paid by the store. Therefore, improvements are desirable.

SUMMARY

In accordance with the present invention, the above and other problems are solved by the following:

In one aspect of the present invention, a method of detecting fraud involving a check being cashed is disclosed. The method includes reading electronic information from an ID; reading visible information from a face of the ID; determining if the electronic information from the ID matches the visible information from the ID; and if the electronic information from the ID does not match the visible information from the ID, preventing the check from being cashed.

In another aspect of the present invention, a computer program product readable by a computing system and encoding instructions for a computer process for detecting fraud involving a check being cashed is disclosed. The computer process includes reading electronic information from an ID; reading visible information from a face of the ID; determining if the electronic information from the ID matches the visible information from the ID; and if the electronic information from the ID does not match the visible information from the ID, preventing the check from being cashed.

In another aspect of the present invention, a system for detecting fraud involving a check being cashed is discussed. The system includes a first ID read module, a second ID read module, a first match module, and a first not cash module. The first ID read module reads electronic information from an ID. The second ID read module reads visible information from a face of the ID. The first match module determines if the electronic information from the ID matches the visible information from the ID. The first not cash module prevents the check from being cashed if the electronic information from the ID does not match the visible information from the ID.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its scope may be obtained from the accompanying drawings, which are briefly described below, from the following detailed descriptions of presently preferred embodiments of the invention and from the appended claims.

BRIEF DESCRIPTION OF THE DRAWINGS

Referring now to the drawings in which like reference numbers represent corresponding parts throughout.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and changes may be made without departing from the scope of the present invention.

The present disclosure describes methods and systems for fraud detection and more particular fraud detection for check cashing. In general, a fraud detection system compares embedded electronic information to visible readable information for both an identification (ID) and the check being cashed. The person cashing the check can compare the electronic information to the visible information to make sure all of the information matches. Of course, software can be used to perform the same function.

Typically, IDs, such as a Driver's License, have a bar code and or a magnetic stripe. In most states, state IDs include both a bar code and a magnetic stripe, but in some states, only one is included on the ID. The bar code and/or magnetic stripe have embedded electronic information regarding the ID. This information is typically a duplicate of the information visible on the face of the ID but stored in an electronic format readable by an electronic device. The information contained in the bar code, magnetic stripe, or the visible face of the ID can include, for example, eye color, height, weight, sex, expiration date, birth date, address, driver's license number, signature, endorsements, and restrictions.

Likewise, a check typically has a bar code on it that includes embedded electronic information regarding the check. The electronic information is typically written in magnetic ink. This information is typically a duplicate of the information visible on the face of the check but stored in an electronic format readable by an electronic device. In addition, the it contains a bank routing number, check number, and a unique company or individual account number.

Typically, a person trying to cash fraudulent checks will alter the visible information and/or the electronic information of either the ID or the Check. However, it is difficult to alter all of the visible and electronic information on both the check and the ID. Therefore, by comparing the electronic information to the visible information on both the check and the ID, fraudulent check cashing can be determined. This system is advantageous because it provides a way to identify fraudulent activity before the check is ever cashed.

Figure 1:
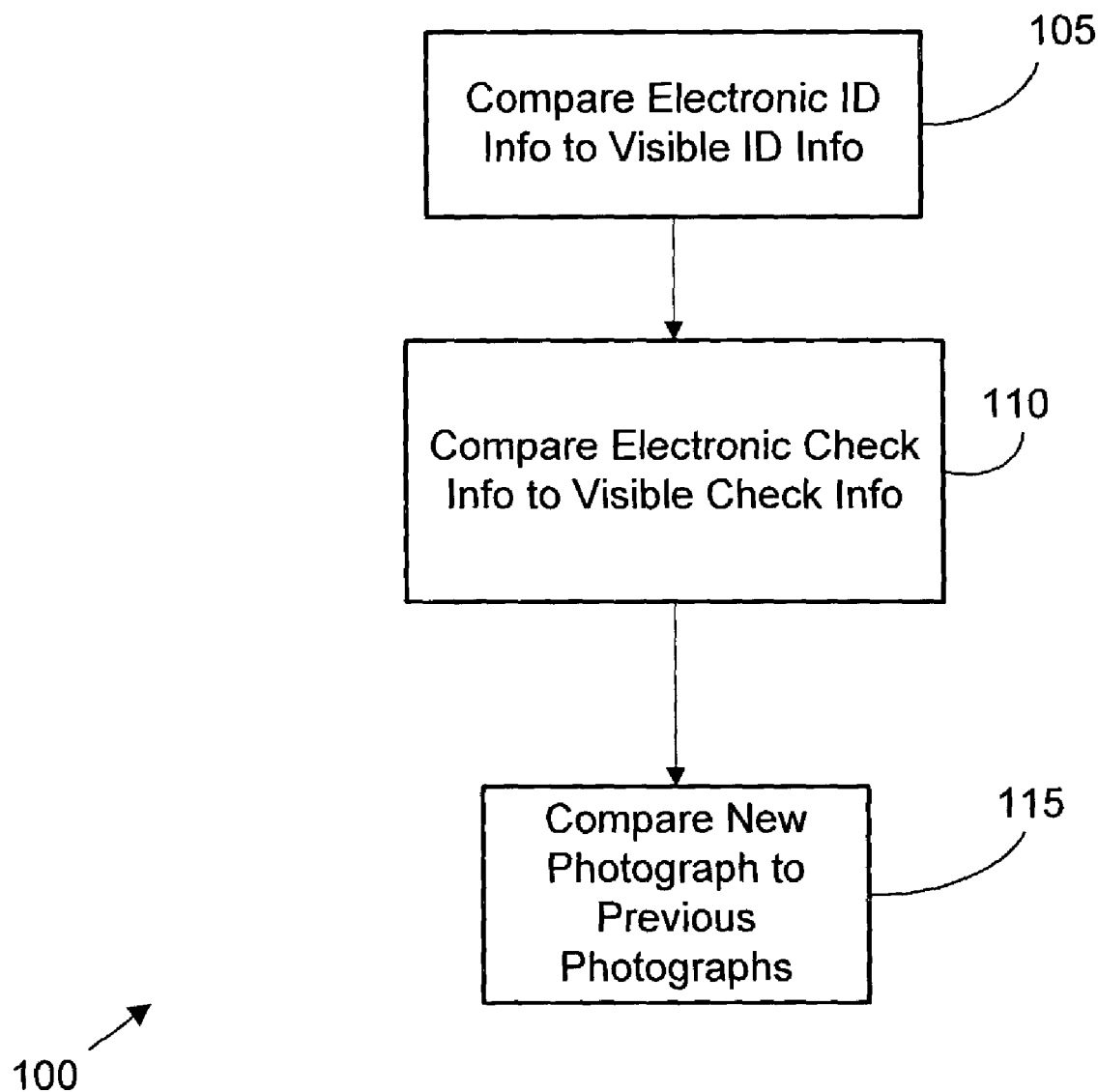
FIG. 1 is a schematic representation of methods and systems for fraud detection, according to an exemplary embodiment of the present disclosure.

Referring now to FIG. 1, a schematic representation of a fraud detection system 100 is illustrated. At block 105, electronic ID information is compared to visible ID information. Of course, anywhere visible information is discussed herein, the visible information can be scanned and optical character recognition (OCR) software can be used to electronically compare the visible ID information to the electronic ID information.

The electronic ID information can include either the information embedded in the bar code or in the magnetic stripe, and the visible ID information can be the information visible on the face of the ID. If the electronic ID information does not match the visible ID information, the process is rejected. Other electronic ID information can be compared also, for example, routing tables, zip codes, transaction numbers, account numbers, check numbers, and check amounts.

At block 110, electronic check information is compared to visible check information. The comparison can be done by either an operator or by OCR. The electronic check information can include the information embedded in magnetic ink, and the visible check information, or OCR check information, can be the information visible on the face of the ID or from tables. If the electronic check information does not match the visible check information, the process is rejected.

At block 115, a new photograph is compared to any previous photographs of the customer. The comparison can be done by either an operator or by OCR. Preferably, each time a check is cashed by a customer, the customer's photograph is taken and electronically stored for comparison in successive check cashing transactions. If the new photograph does not match any previous photographs, the process is rejected.

Figure 2:
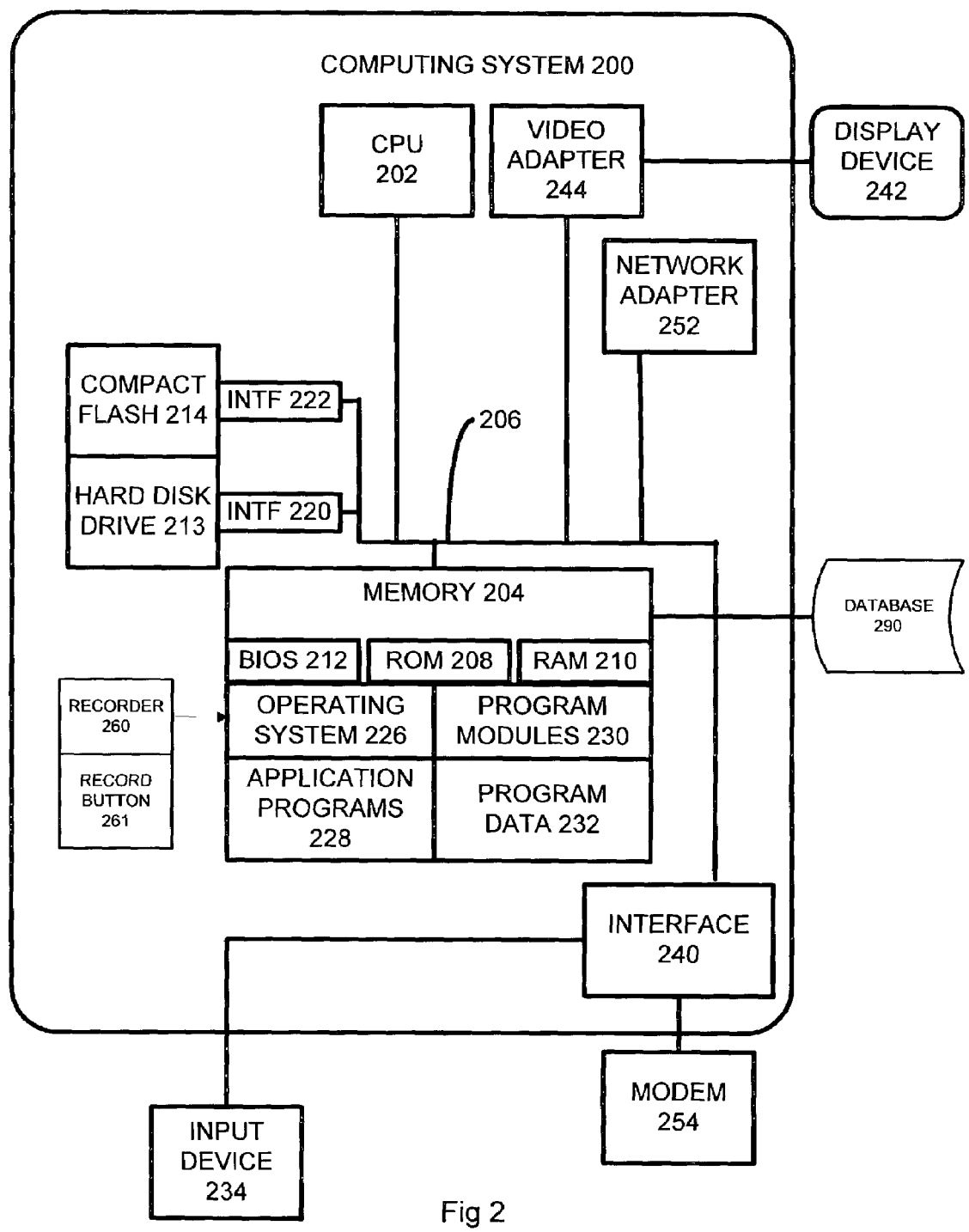
FIG. 2 is a schematic representation of a computing system that may be used to implement aspects of the present disclosure.

FIG. 2 and the following discussion are intended to provide a brief, general description of a suitable computing environment in which the invention might be implemented. Although not required, the invention is described in the general context of computer-executable instructions, such as program modules, being executed by a computing system. Generally, program modules include routines, programs, objects, components, data structures, etc. that perform particular tasks or implement particular abstract data types.

Those skilled in the art will appreciate that the invention might be practiced with other computer system configurations, including handheld devices, palm devices, multiprocessor systems, microprocessor-based or programmable consumer electronics, network personal computers, minicomputers, mainframe computers, and the like. The invention might also be practiced in distributed computing environments where tasks are performed by remote processing devices that are linked through a communications network.

In a distributed computing environment, program modules might be located in both local and remote memory storage devices.

Referring now to FIG. 2, an exemplary environment for implementing embodiments of the present invention includes a general purpose computing device in the form of a computing system 200, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage device 213, such as a hard disk drive, for reading from and writing to a hard disk (not shown), and/or a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, digital camera, touch screen, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor or touch screen LCD panel, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
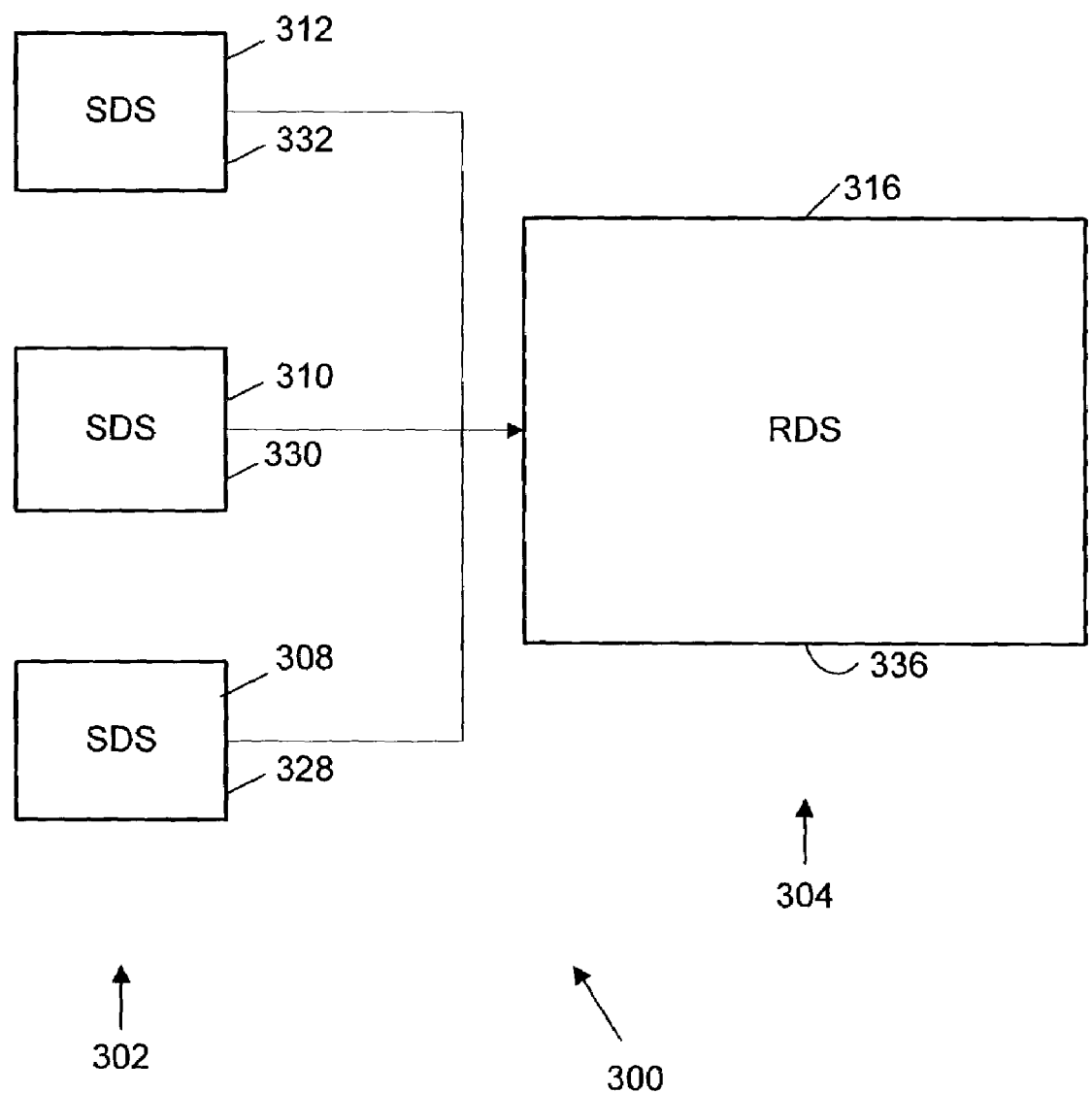
FIG. 3 is a schematic representation of a computing arrangement that may be used to implement aspects of the present disclosure.

Referring now to FIG. 3, an exemplary environment 300 for implementing embodiments of the present invention includes a multi-tier architecture comprising a client tier 302 and a server tier 304. The client tier 302 and the server tier 304 might contain any number of computing systems, for example, the computing system 200 as described in connection with FIG. 2. In the embodiment illustrated in FIG. 3, the client tier 302 includes a plurality of client computing systems 308, 310, 312. The server tier 304 includes a server computing systems 316. Preferably, both the client tier 302 and the server tier 304 are accessible via the World Wide Web, LAN, dial-up modems, and any other suitable communication media.

The client computing systems 308, 310, 312 include free-standing store check cashing fraud detection systems, or store detection system (SDS), 328, 330, 332, respectively. Preferably, the SDS 328, 330, 332 include a computing system, such as the computing system 200 as described in connection with FIG. 2, a flat-panel touch screen display, or a monitor and a mouse, and a number of input/output devices. The server computing system 316 includes a centralized control center system, or a regional detection system (RDS), 336. Preferably, the server computing system 336 is used to observe, or track, the overall operation of the total system, accumulate data on the system's overall performance, back-up SDS data files and print a series of accounting and fraudulent reports.

All of the client computing system 308, 310, 312 and the server computing system 336 can be connected together via a LAN, WAN, or a telephone system.

Figure 4:
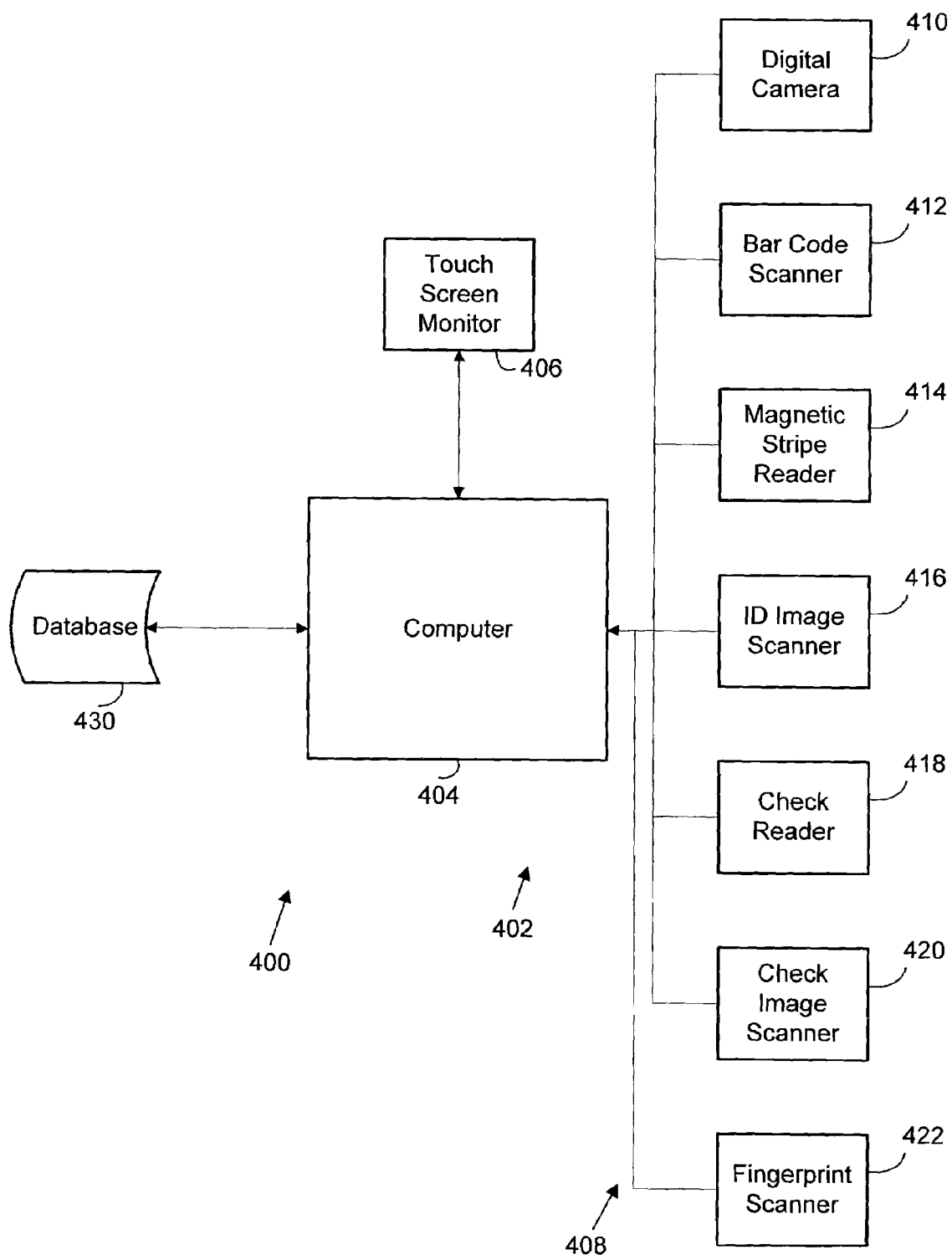
FIG. 4 is a block diagram illustrating components of a computing system that may be used to implement aspects of the present disclosure.

Referring now to FIG. 4, an exemplary environment 400 for implementing embodiments of the present invention includes an SDS 402. Preferably, the SDS 402 includes a computing system 404, for example a PC with an AMD Athlon 1.2 Ghz Processor, 40 GB HD, 56K modem, Shuttle Motherboard, 512 MB RAM, PC 133 Bus, and Windows 2000 operating system; a touch-screen monitor 406; and a number of input/output devices 408.

The input/output devices 408 can include input/output devices such as a digital camera 410, for example a Logitech Quickcam Pro 3000; a bar code ID scanner 412, for example, a 1D, 2D Bar Code Reader; a magnetic stripe reader 414, for example, a MINI MICR RS232 with 3-Track MSR by Magtek, Inc.; an ID image scanner 416, for example, a BizCardReader 600c Scanner; a check magnetic ink scanner 418, for example, a MINI MICR RS232 with 3-Track MSR by Magtek, Inc.; a check image scanner 420; and a fingerprint scanner 422. Any of the image scanners could be replaced by a digital camera to take an electronic photograph of the image rather than to scan the image with a scanner.

Preferably, the SDS 402 is connected to a database 430. The database 430 is the ultimate depository of the electronic information gathered by the SDS 402. The database 430 can be any conventional database and can be internal to the SDS 402 or external to the SDS 402, for example, be contained within the RDS 336 of FIG. 3, or be completely external as a separate unit.

Figure 5:
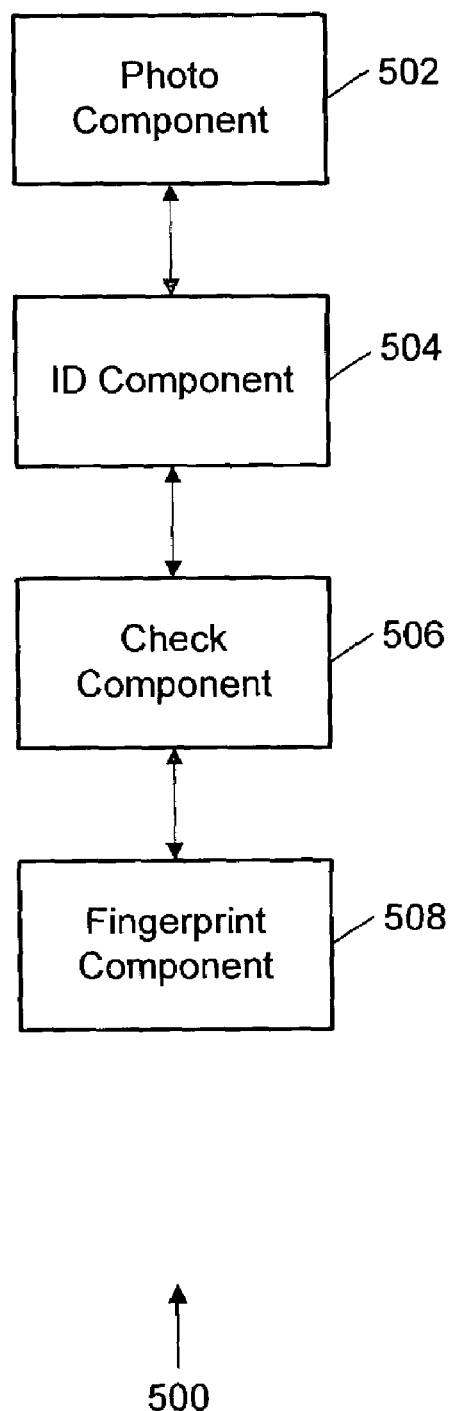
FIG. 5 is a block diagram illustrating components of a fraud detection system that may be used to implement aspects of the present disclosure.

FIG. 5 is a block diagram illustrating the components of an example fraud detection system 500 that might be implemented as a method of doing business and/or a software application loaded on a computing system, such as the server computing system 200 of FIG. 2, or a combination of the two. The fraud detection system 500 includes a photo component 502, an ID component 504, a check component, and a fingerprint component.

The photo component 502 takes a photograph of the customer and compares it to any previous photographs of the customer. The photo component 502 also compares the photographs for any inconsistencies. The ID component 504 reads electronic information from an ID and visible information, or OCR, on the face of the ID. The ID component 504 also compares the information for any inconsistencies. The check component 506 reads electronic information from the check and visible information, or OCR, on the face of the check. The check component 506 also compares the information for any inconsistencies. The fingerprint component 508 scans a fingerprint of a customer and compares it to any previous fingerprints of the customer. The fingerprint component 508 also compares the fingerprints for any inconsistencies.

Figure 6:
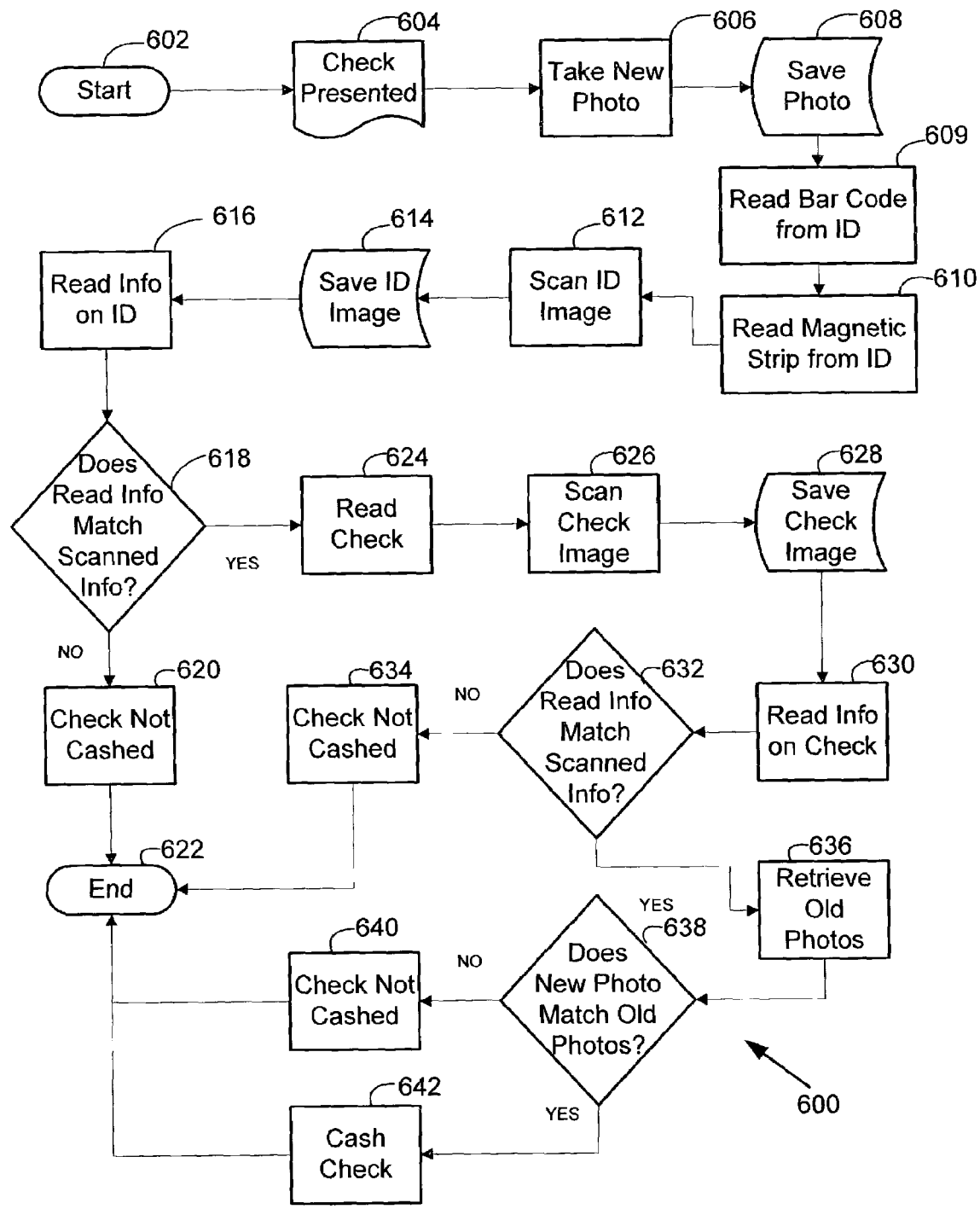
FIG. 6 is a flow chart illustrating the logical operations of an example fraud detection system, according to aspects of the present disclosure.

FIG. 6 is a flow chart representing logical operations of a fraud detection system 600. Entrance to the operational flow of the fraud detection system 600 begins at a flow connection 602. A present operation 604 presents a check to be cashed. Typically, a person wishing to cash a check, for example, a payroll check, presents the check and an ID to a clerk to be cashed. Operational flow proceeds to a photo operation 606. The photo operation 606 takes a photograph, for example, a digital photograph, of the person presenting the check for cashing. The photo save operation 608 saves the photograph to, for example, a computer hard drive or database.

A first ID read operation 609 reads the electronic information from the bar code of an ID, for example, a driver's license. A second ID read operation 610 reads electronic information from the magnetic stripe of the ID. In some instances, only one of the steps 609 or 610 might be implemented, for example, when the ID only has a bar code or a magnetic stripe. An ID scan operation 612 scans the ID and creates a digital image of the face of the ID. An ID save operation 614 saves the digital image of the ID for later reference to, for example, a computer hard drive or database. Of course, the digital image of the ID can be created with a digital camera instead of a scanner. A third ID read operation 616 reads the visible information on the face of the ID.

A match module 618 determines if the visible information from the third ID read operation 616 matches the electronic information from the first ID read operation 609 and the second ID read operation 610. If the match module 618 determines that the information from the third ID read operation 616 does not match the electronic information from the first ID read operation 609 and the second ID read operation 610, operational flow branches "NO" to a first not operation 620, and the check is not cashed. Operational flow ends at terminal point 622. However, the customer might not be alerted to the not cash operation until the remainder of the information is collected.

If the match module 618 determines that the visible information from the third ID read operation 616 does match the electronic information from the first ID read operation 609 and second ID read operation 610, operational flow branches "YES" to a first check read operation 624. The first check read operation 624 reads the electronic information from the check, for example, by a magnetic ink scanner. A check scan operation 626 scans the face of the check and creates a digital image of the face of the check. Of course, the digital image of the check can be created with a digital camera instead of a scanner. A check save operation 628 saves the digital image of the face of the check for later reference, for example, to a computer hard drive or database.

A second check read operation 630 reads the visible information on the face of the check. A second match module 632 determines if the visible information from the second check read operation 630 matches the electronic information from the first check read operation 624. If the second match module 632 determines that the visible information from the second check read operation 630 does not match the electronic information from the first check read operation 624, operational flow branches "NO" to a second not operation 634, and the check is not cashed. Operational flow proceeds to the terminal point 622.

If the second match module 632 determines that the visible information from the second check read operation 630 does match the electronic information from the first check read operation 624, operational flow branches "YES" to a retrieve operation 636. The retrieve operation 636 retrieves any previously taken photographs of the customer that might exist. Since each present operation 604 results in a photo operation 606 and a save operation 608, photographs from previous present operations are available for later comparison.

A third match operation 638 determines if the new photograph of the customer received from the photo operation 606 matches any old photographs that might be in the system from a previous check cashing. If the third match operation 636 determines that the new photograph does not match the old photographs in the system, operational flow branches "NO" to a third not operation 640, and the check is not cashed. Operational flow proceeds to the terminal point 622.

If the third match module 638 determines that the new photograph does match the old photographs in the system, assuming old photographs exist, operational flow branches "YES" to a cash operation 642, and the check is cashed. Operational flow proceeds to the terminal point 622. Of course, if old photographs are not available, i.e., this is the first time a check has been presented by a customer, operations 636, 638, and 640 are bypassed and operational flow proceeds to the cash operation 642.

As described above in connection with FIG. 6, each match operation 618, 632, 638 branches "NO" to a not cashed operation 620, 634, 640, respectively. Alternatively, the not cash operations 620, 634, 640 can just set a flag for not cash, and the process continues as described above for the "YES" branch of each match operation 618, 632, 638. Thus, all of the transaction information can be collected before the customer is informed that the check will not be collected.

When a customer is a repeat customer, some of the steps described in connection with FIG. 6 can be skipped to speed up the transaction. However, should any part of the data gathered be different than previously collected, none of the steps will be skipped. This will further deter fraud. This information can be used by law enforcement for prosecution.

If the system described in FIG. 6 results in a no cash result, the no cash result can be manually overridden by a person with sufficient authority to override the system.

The operational flow chart depicted in FIG. 6 may best be understood in terms of an application example. Referring to FIGS. 4 and 6, a customer walks into a store and presents a check to be cashed to a clerk at the present operation 604. The SDS system takes a digital photograph of the customer using the digital camera 410 at photo operation 606. The photo save operation 608 saves the digital photograph on the computer 404. The clerk asks the customer for an ID. The clerk reads the bar code from the ID using the bar code scanner 412 at the first ID read operation 609. The clerk reads the magnetic stripe from the ID using the magnetic stripe reader 414 at the second ID read operation 610. The clerk scans the face of the ID using the ID image scanner 416 at the ID scan operation 612. The ID save operation 614 saves the image of the ID to the computer 404.

The clerk reads the visible information on the ID at the third ID read operation 616. At the first match module 618, the clerk compares the information from the first ID read operation 609, the second ID operation 610, and the third ID operation 616 and determines if all of the information from the first ID operation 609, the second ID operation 610, and the third ID operation 616 all matches. The clerk determines that the information from the first ID operation 609, the second ID operation 610, and the third ID operation 616 does not all match. The check is not cashed at the first not operation 620, the transaction details are saved to a database, and the process ends at terminal point 622.

In another application example, the process follows that described above until the first match module 618. In this application example, the clerk determines that the information from the first ID operation 609, the second ID operation 610, and the third ID operation 616 does all match. The clerk reads the electronic information from the bar code of the check using the check reader 418 at the first check read operation 624. The clerk scans the face of the check using the check image scanner 420 at the check scan operation 626. The check save operation saves the image of the check to the computer 404. The clerk reads the visible information on the check at the second check read operation 630.

At the second match module 632, the clerk determines if the information read from the bar code of the check at the first check read operation 624 matches the visible information read by the clerk at the second check read operation. If the clerk determines that the information read from the bar code of the check at the first check read operation 624 does not match the visible information read by the clerk at the second check read operation 630, the check is not cashed at the second not operation 634, and the process stops at the terminal point 622.

In another application example, the process is as described above until the second match module 632. In this application example, the clerk determines that the information read from the bar code of the check at the first check read operation 624 does match the visible information read the clerk at the second check read operation 630. If the customer has cashed a check before, any old photographs taken by the customer at the photo operation 606 previously are retrieved for viewing by the clerk.

At the third match module 638, the clerk compares the current photograph taken at the photo operation 606 to the previously taken photographs. If the clerk determines that the current photograph taken at the photo operation 606 does not match the previously taken photographs, the check is not cashed at the third not operation 640. The process ends at the terminal point 622.

In another application example, the process proceeds as described above until the third match module 638. In this application example, the clerk determines that the current photograph taken at the photo operation 606 does match the previously taken photographs, and the check is cashed at the cash operation 642. The process ends at the terminal point 622.

Figure 7:
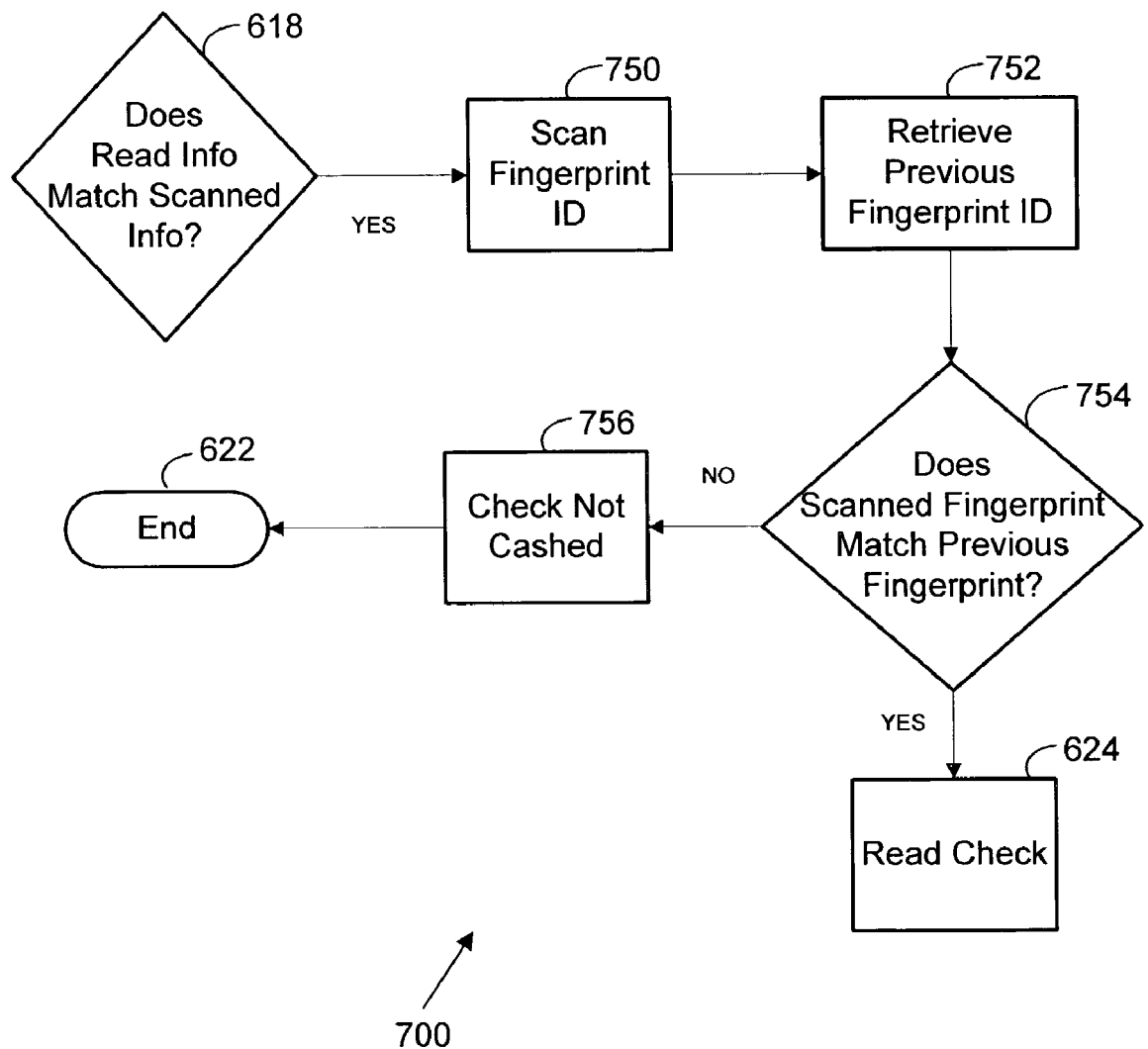
FIG. 7 is a flow chart illustrating the logical operations of another example fraud detection system, according to aspects of the present disclosure.

FIG. 7 is a flow chart representing logical operations of another fraud detection system 700. The fraud detection system uses all of the operations and modules of the fraud detection system 600 of FIG. 6, but adds another series of operations and another match module placed in the operational flow between the "YES" branch of the second match module 618 and the read check operation 624. Operation flow proceeds as described in connection with FIG. 6 through the "YES" branch of the second match module 618. A scan fingerprint operation 750 scans the fingerprint of the customer. The fingerprint retrieve operation 752 retrieves previously scanned fingerprints, if any. Similar to the retrieve operation 635, if there are not any previous fingerprints, steps 752 and 754 are skipped.

A fourth match module 754 determines if the scanned fingerprint from the scan fingerprint operation 750 matches the previous fingerprints retrieved by the fingerprint retrieve operation 752. If the fourth match module 754 determines that the scanned fingerprint from the scan fingerprint operation 750 does not match the previous fingerprints retrieved by the fingerprint retrieve operation 752, operational flow branches "NO" to a fourth not operation 756, and the check is not cashed. Operational flow ends at the terminal point 622.

If the fourth match module 754 determines that the scanned fingerprint from the scan fingerprint operation 750 does match the previous fingerprints retrieved by the fingerprint retrieve operation 752, operational flow branches "YES" to the first check read operation 624, and operational flow proceeds as described in connection with FIG. 6.

The operational flow chart depicted in FIG. 7 may best be understood in terms of an application example. Referring to FIGS. 4, 6, and 7, operational flow proceeds as previously described in connection with FIG. 6 through the "YES" branch of the second match module 618. At the scan fingerprint operation 750, the clerk scans the fingerprint of the customer using the fingerprint scanner 422. The fingerprint retrieve operation 752 retrieves any previous fingerprints. At the fourth match module 754, the system determines that the scanned fingerprint from the scan fingerprint operation 750 does not match the previous fingerprints from the retrieve fingerprint operation 752, and the check is not cashed at the fourth not operation 756. Operational flow ends at the terminal point 622.

In another application example, operational flow proceeds as described above. At the fourth match module, the system determines that the scanned fingerprint from the scan fingerprint operation 750 does match the previous fingerprints from the retrieve fingerprint operation 752. Operational flow proceeds the first check read operation 624, and operational flow proceeds as described above in connection with FIG. 6.

In the above described processes and methods, a person, clerk, or a computer system can be used to perform many of the functions.

The logical operations of the various embodiments illustrated herein are implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method of detecting fraud involving a check being cashed, the method comprising:
   reading electronic information from an ID;
   reading visible information from the ID;
   determining if the electronic information from the ID matches the visible information from the ID;
   reading electronic information from a check presented for cashing;
   reading visible information from the check;
   determining if the electronic information from the check matches the visible information from the check;
   reading a first type of biometric data from a customer presenting the check for cashing;
   retrieving a first stored type of biometric data previously obtained from the customer;

determining if the first type of biometric data matches the first stored type of biometric data;
reading a second type of biometric data from the customer presenting the check for cashing;
retrieving a second stored type of biometric data previously obtained from the customer;
determining if the second type of biometric data matches the second stored type of biometric data;
preventing the check from being cashed if at least one of the following is true:
the electronic information from the ID does not match the visible information from the ID;
the electronic information from the check does not match the visible information from the check;
the first type of biometric data does not match the first stored type of biometric data; and
the second type of biometric data does not match the second stored type of biometric data; and
enabling the check to be cashed if each of the following is true:
the electronic information from the ID matches the visible information from the ID;
the electronic information from the check matches the visible information from the check;
the first type of biometric data matches the first stored type of biometric data; and
the second type of biometric data matches the second stored type of biometric data.

2. The method of claim 1, wherein the first type of biometric data includes a photograph of the customer.

3. The method of claim 1, wherein the second type of biometric data includes a fingerprint of the customer.

4. A method according to claim 1, wherein reading electronic information includes reading electronic information from a bar code.

5. A method according to claim 1, wherein reading electronic information includes reading electronic information from a magnetic stripe.

6. A method according to claim 1, wherein reading electronic information from the check includes reading electronic information from magnetic ink of the check.

7. A method according to claim 1, wherein determining includes determining if the electronic information from the bar code, electronic information from the magnetic stripe, and the visible information all match.

8. A method according to claim 1, wherein the taking a new photograph of a customer includes taking a digital photograph of the customer.

9. A system for detecting fraud involving a check being cashed, the system comprising:
a storage module configured to store at least one of previous photographs taken of a customer and previous fingerprints taken from a customer;
a photograph module configured to take at least one new photograph of each customer presenting one or more checks for cashing and to compare the new photographs to any previous photographs of the customer stored on the storage component for inconsistencies;
a fingerprint module configured to scan a fingerprint of the customer and to compare the fingerprint to any previous fingerprints of the customer stored on the storage component for inconsistencies;
an ID module configured to read electronic information from an ID and visible information from the ID, the ID module also being configured to compare the electronic information from the ID to the visible information from the ID for inconsistencies;
a check module configured to read electronic information from the check and visible information from the check, the check module also being configured to compare the electronic information from the check to the visible information from the check for inconsistencies; and
a cash module configured to cash the check if the photograph module and the fingerprint module and the ID module and the check module find no inconsistencies.

10. A system according to claim 9, wherein the photograph module comprises:
a new photo module configure to take a new photograph of a customer presenting the check for cashing;
a first retrieve module that retrieves a previously taken photograph of the customer; and
a photo match module that compares the new photograph to the previously taken photograph.

11. A system according to claim 9, wherein the fingerprint module comprises:
a scan module that scans a new fingerprint of the customer;
a second retrieve module that retrieves a previously taken fingerprint of the customer; and
a fingerprint match module that compares the new fingerprint to the previously taken fingerprint.

12. A computer program product readable by a computing system and encoding instructions for a computer process for detecting fraud involving a check being cashed, the computer process comprising:
reading electronic information from an ID;
reading visible information from the ID;
determining if the electronic information from the ID matches the visible information from the ID;
reading electronic information from a check presented for cashing;
reading visible information from the check;
determining if the electronic information from the check matches the visible information from the check;
reading a first type of biometric data from a customer presenting the check for cashing;
retrieving a first stored type of biometric data previously obtained from the customer;
determining if the first type of biometric data matches the first stored type of biometric data;
reading a second type of biometric data from the customer presenting the check for cashing;
retrieving a second stored type of biometric data previously obtained from the customer; and
determining if the second type of biometric data matches the second stored type of biometric data;
allowing the customer to cash the check if all of the following are true:
the electronic information from the ID matches the visible information from the ID;
the electronic information from the check matches the visible information from the check;
the first type of biometric data matches the first stored type of biometric data; and
the second type of biometric data matches the second stored type of biometric data.

13. A computer program product according to claim 12, further comprising:
preventing the check from being cashed if at least one of the following is true:
the electronic information from the ID does not match the visible information from the ID;
the electronic information from the check does not match the visible information from the check;

the first type of biometric data does not match the first stored type of biometric data; and the second type of biometric data does not match the second stored type of biometric data.

14. A computer program product according to claim 13, wherein reading electronic information includes reading electronic information from a bar code of an ID.

15. A computer program product according to claim 13, wherein reading electronic information includes reading electronic information from a magnetic stripe of an ID.

16. A computer program product according to claim 13, wherein reading electronic information from the check includes reading electronic information from a bar code of the check.

17. A computer program product according to claim 13, wherein the taking a new photograph of a customer includes taking a digital photograph of the customer.

* * * * *